United States Patent
Dille (10) Patent No.: US 9,927,036 B2
(45) Date of Patent: Mar. 27, 2018

(54) VALVE ASSEMBLY

(71) Applicant: FORUM US, INC., Houston, TX (US)

(72) Inventor: Mark C. Dille, Houston, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 14/697,204

(22) Filed: Apr. 27, 2015

(65) Prior Publication Data

US 2016/0312903 A1    Oct. 27, 2016

(51) Int. Cl.
| | | |
|---|---|---|
| F16K 1/38 | (2006.01) | |
| F16K 47/00 | (2006.01) | |
| F16K 1/42 | (2006.01) | |
| F16K 15/06 | (2006.01) | |
| F16K 25/00 | (2006.01) | |
| F16K 15/02 | (2006.01) | |

(52) U.S. Cl.
CPC .............. *F16K 1/38* (2013.01); *F16K 1/42* (2013.01); *F16K 47/00* (2013.01); *F16K 15/021* (2013.01); *F16K 15/06* (2013.01); *F16K 25/00* (2013.01); *Y10T 137/7868* (2015.04)

(58) Field of Classification Search
CPC ... F16K 1/36; F16K 1/38; F16K 1/385; F16K 1/42; F16K 15/00; F16K 15/06; F16K 15/063; F16K 25/00; F16K 25/005; F16K 47/00; F16K 15/02; F16K 15/021; Y10T 137/7868
USPC .... 137/516.29, 902, 904; 251/332, 333, 334
See application file for complete search history.

(56) References Cited

U.S. PATENT DOCUMENTS

| | | | | |
|---|---|---|---|---|
| 1,581,778 | A * | 4/1926 | Blomgren | 137/468 |
| 1,957,998 | A * | 5/1934 | Finefrock | F16K 15/06 |
| | | | | 137/329.04 |
| 1,963,684 | A * | 6/1934 | Shimer | F16K 15/063 |
| | | | | 137/329.04 |
| 2,521,314 | A * | 9/1950 | Therolf | F04B 53/1027 |
| | | | | 251/332 |
| 3,053,500 | A * | 9/1962 | Atkinson | F04B 53/1025 |
| | | | | 137/543.23 |
| 3,324,880 | A * | 6/1967 | Roberts et al. | 137/516.29 |
| 3,483,885 | A * | 12/1969 | Leathers | 137/329.02 |
| 4,687,421 | A * | 8/1987 | Cameron | F04B 49/10 |
| | | | | 137/543.21 |
| 4,951,707 | A * | 8/1990 | Johnson | 137/516.29 |
| 5,088,521 | A * | 2/1992 | Johnson | 137/516.29 |

(Continued)

OTHER PUBLICATIONS

"Foil," Web Page <http://www.vocabulary.com/dictionary/foil>, Oct. 3, 2012, retrieved from Internet Archive Wayback Machine <https://web.archive.org/web/20121003002643/http://www.vocabulary.com/dictionary/foil> on Aug. 6, 2015.*

(Continued)

*Primary Examiner* — Mary McManmon
*Assistant Examiner* — Richard K Durden
(74) *Attorney, Agent, or Firm* — Patterson & Sheridan, L.L.P.

(57) ABSTRACT

A valve assembly having a seat, a valve body, and a seal. The valve body has an outer circumferential surface defined by an upper planar surface, a lower planar surface, and a groove disposed between the upper planar surface and the lower planar surface. The seal is coupled to the outer circumferential surface of the valve body. The valve body and the seal are movable into engagement with the seat to form a seal.

31 Claims, 5 Drawing Sheets

(56) References Cited

U.S. PATENT DOCUMENTS

| | | | | |
|---|---|---|---|---|
| 5,249,600 A * | 10/1993 | Blume | | 137/516.29 |
| 5,345,965 A * | 9/1994 | Blume | | 137/533.25 |
| 7,222,837 B1 | 5/2007 | Blume | | |
| 7,591,450 B1 | 9/2009 | Blume | | |
| 7,641,175 B1 | 1/2010 | Blume | | |
| 7,681,589 B2 * | 3/2010 | Schwegman | | F16K 15/063 |
| | | | | 137/15.17 |
| 8,141,849 B1 | 3/2012 | Blume | | |
| 2011/0079302 A1 * | 4/2011 | Hawes | | F16K 25/005 |
| | | | | 137/538 |
| 2013/0263932 A1 | 10/2013 | Baxter et al. | | |
| 2014/0070127 A1 | 3/2014 | Blume | | |
| 2014/0083534 A1 | 3/2014 | Blume | | |
| 2014/0264134 A1 | 9/2014 | Butler et al. | | |
| 2015/0000748 A1 * | 1/2015 | Shelcoviz et al. | | 137/1 |

OTHER PUBLICATIONS

Official Action for Canadian Application No. 2,922,682 dated Oct. 13, 2017.

\* cited by examiner

Fig. 6C

VALVE ASSEMBLY

BACKGROUND

Field of the Disclosure

Embodiments of the disclosure generally relate to a valve assembly.

Description of the Related Art

Multiplex reciprocating pumps are commonly used in the oil and gas industry. In an operation commonly known as "fracing," the pumps are used to pump fluids at high pressure into one or more wellbores that are drilled into the ground to create fractures in an oil and/or gas reservoir surrounding the wellbore. The pumps comprise a power end and a fluid end. The power end has a motor that powers a crankshaft, which reciprocates a connecting rod and a plunger connected to the connecting rod within the fluid end to pump fluid through fluid bores of the fluid end. Reciprocating motion of the plunger within the fluid end pumps fluid from a suction end of the fluid bores to a discharge end of the fluid bores.

Suction and discharge valves are disposed within the fluid end to open and close fluid flow from the suction end to the discharge end of the fluid bores. The suction and discharge valves have to be replaced frequently because the fluids pumped through the fluid bores are abrasive, corrosive, and/or are pumped at high pressures and flow rates, which cause wear on the valve components. Repetitive opening and closing of the suction and discharge valves during operation also contributes to rapid wear of the valve components.

Therefore, there is a continuous need for new and improved valve assemblies.

SUMMARY

According to one embodiment, a valve assembly comprises a seat, a valve body, and a seal. The valve body has an outer circumferential surface defined by an upper planar surface, a lower planar surface, and a groove disposed between the upper planar surface and the lower planar surface. The seal is coupled to the outer circumferential surface of the valve body. The valve body and the seal are movable into engagement with the seat.

BRIEF DESCRIPTION OF THE DRAWINGS

So that the manner in which the above recited features of the disclosure can be understood in detail, a more particular description of embodiments of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

It is contemplated that any feature of any embodiment may be combined with any feature of any other embodiment without further recitation.

DETAILED DESCRIPTION

The embodiments described herein generally relate to a valve assembly for use within a fluid end of a multiplex pump. Examples of a multiplex pump and a fluid end that can be used with the embodiments disclosed herein are described in U.S. Patent Application Publication No. 2013/0263932, filed on Mar. 15, 2013, the contents of which are herein incorporated by reference in its entirety. Although the embodiments of the valve assembly are described herein as a component of a fluid end, the embodiments of the valve assembly can be used with other types of equipment.

Figure 1:
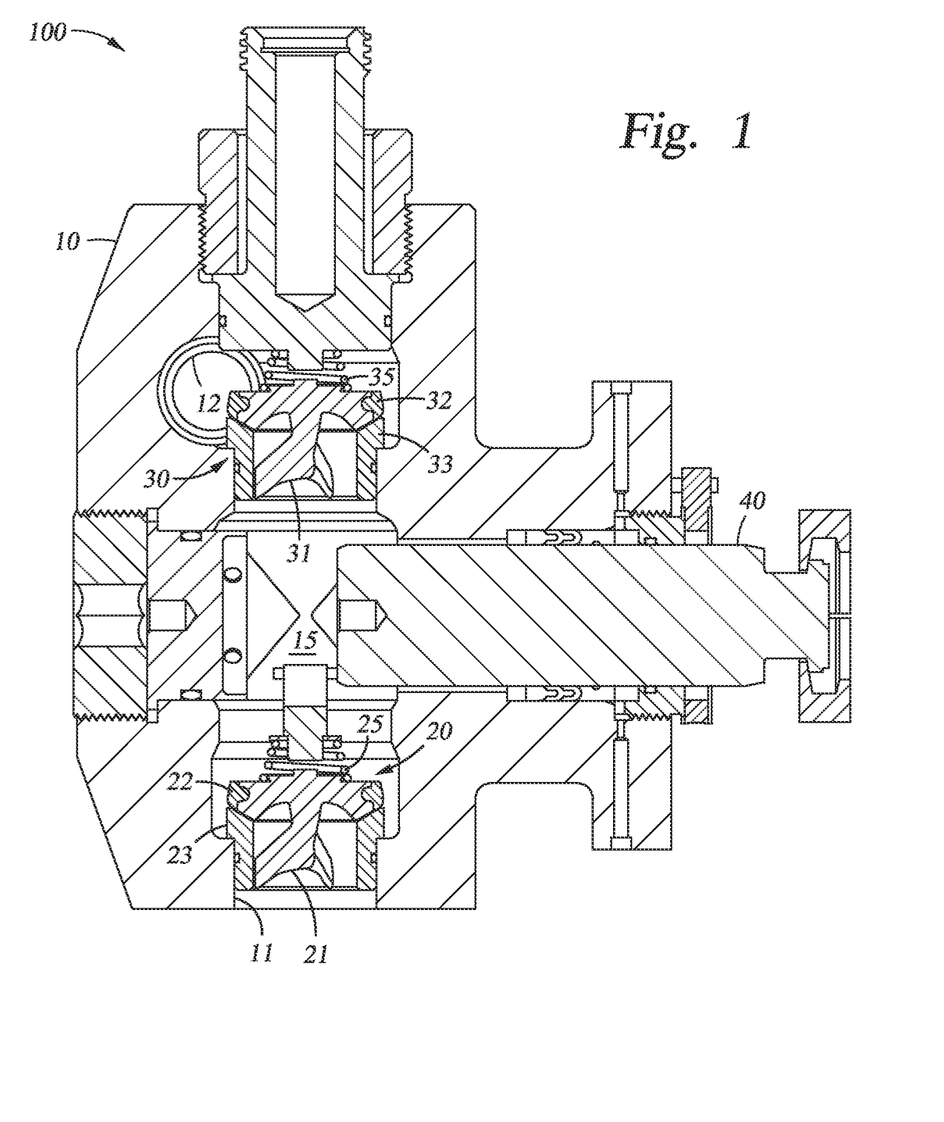
FIG. 1 illustrates a sectional view of a fluid end, according to one embodiment.

FIG. 1 illustrates a sectional view of a fluid end 100, according to one embodiment. The fluid end 100 includes a body 10 with a fluid bore 15 disposed through the body 10. The fluid bore 15 has a suction end 11 through which fluid from a fluid source (not shown) is pumped into the body 10, and a discharge end 12 through which the fluid is pumped out of the body 10.

A suction valve assembly 20 is disposed within the body 10 and controls fluid flow into the fluid bore 15 from the suction end 11. The suction valve assembly 20 includes a valve body 21, a seal 22, a seat 23, and a biasing member 25, such as a spring. The suction valve assembly 20 is biased into a closed position by the biasing member 25 to prevent fluid from flowing past the suction valve assembly 20. Specifically, the valve body 21 and/or the seal 22 are moved into contact with the seat 23 to form a seal that stops fluid flow. The suction valve assembly 20 is movable into an open position to allow fluid flow into the fluid bore 15 when pressurized fluid below the suction valve assembly 20 applies a force on a bottom side of the valve body 21 and/or the seal 22 that is greater than the force of the bias member 25. Specifically, the valve body 21 and/or the seal 22 are moved out of contact with the seat 23 to allow fluid flow through the suction valve assembly 20.

A discharge valve assembly 30 is disposed within the body 10 and controls fluid flow out of the fluid bore 15 through the discharge end 12. The discharge valve assembly 30 may include a valve body 31, a seal 32, a seat 33, and a biasing member 35, such as a spring. The discharge valve assembly 30 is biased into a closed position by the biasing member 35 to prevent fluid from flowing past the discharge valve assembly 30. Specifically, the valve body 31 and/or the seal 32 are moved into contact with the seat 33 to form a seal that stops fluid flow. The discharge valve assembly 30 is movable into an open position to allow fluid flow out of the fluid bore 15 when pressurized fluid below the discharge valve assembly 30 applies a force on a bottom side of the valve body 31 and/or the seal 22 that is greater than the force of the bias member 35. Specifically, the valve body 31 and/or the seal 32 are moved out of contact with the seat 33 to allow fluid flow through the discharge valve assembly 30.

A plunger 40 is continuously reciprocated within the body 10 by a power end (not shown) to pump fluid into the fluid bore 15 through the suction end 11, and pump the fluid out of the fluid bore 15 through the discharge end 12. When the plunger 40 is moved outward from the body 10, the suction valve assembly 20 is moved into the open position to draw fluid into the fluid bore 15, while the discharge valve assembly 30 remains closed. When the plunger 40 is moved inward into the body 10, the discharge valve assembly 30 is moved into the open position to expel fluid out of the fluid bore 15, while the suction valve assembly 20 remains closed. In this manner, fluid is continuously pumped into and out of the fluid end 100.

Figure 2:
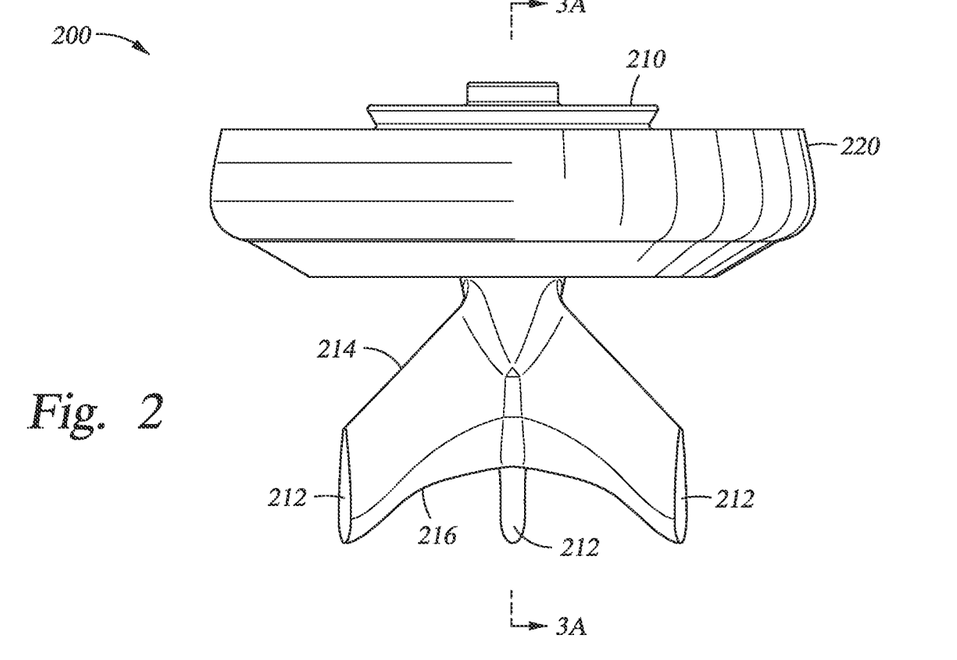
FIG. 2 illustrates a valve body and a seal, according to one embodiment.

FIG. 2 illustrates a valve assembly 200 according to one embodiment. The valve assembly 200 may operate in a similar manner as the suction valve assembly 20 and/or the discharge valve assembly 30 described above. The valve assembly 200 comprises a valve body 210 and a seal 220, which is circumferentially disposed around the valve body 210. Although not illustrated in FIG. 2, the valve assembly 200 may comprise a seat and a biasing member, such as seats 23, 33 and biasing members 25, 35 of the suction and/or discharge valve assemblies 20, 30 described above The valve body 210 is formed out of a material that is cast into a single piece. The valve body 210 may be formed out of one or more materials, including a metallic material. Although the valve body 210 is shown as a single, integral piece of material, the valve body 210 may be formed from multiple pieces coupled together. The valve body 210 may be formed by casting, forging, and/or machining. An upper portion of the valve body 210 supports the seal 220, which is configured to form a seal with a valve seat as further described below.

A lower portion of the valve body 210 has three leg members 212. Each leg member 212 has a tapered upper surface 214 that is slightly rounded, and a rounded lower surface 216 that is slightly tapered. Each leg member 212 has a foil-shaped cross section that minimizes drag and improves the dynamics of fluid flow past the valve body 210. For example, when the valve body 210 is used as a suction and/or discharge valve in a fluid end through which fluid is flowing at high flow rates, the improved hydrodynamic performance of the valve body 210 may reduce cavitation within the fluid end. The lower portion of the valve body 210 may have one, two, three, four, or more leg members 212.

The seal 220 may be formed out of one or more materials that are bonded to the valve body 210. For example, the seal 220 may be formed out of a polyurethane material that is bonded to the valve body 210. The seal 220 may be secured to the valve body 210 in ways other than bonding. The seal 220 may have a hardness between about 85 Shore A durometer to about 95 Shore A durometer.

The entire seal 220 may be moulded into a single piece. Alternatively, at least the outer surfaces of the seal 220 may be moulded into shape, while the inner surfaces are machined into shape to help improve bonding of the inner surfaces of the seal 220 to the valve body 210. Alternatively, the seal 220 may be machined into shape.

Figure 3A:
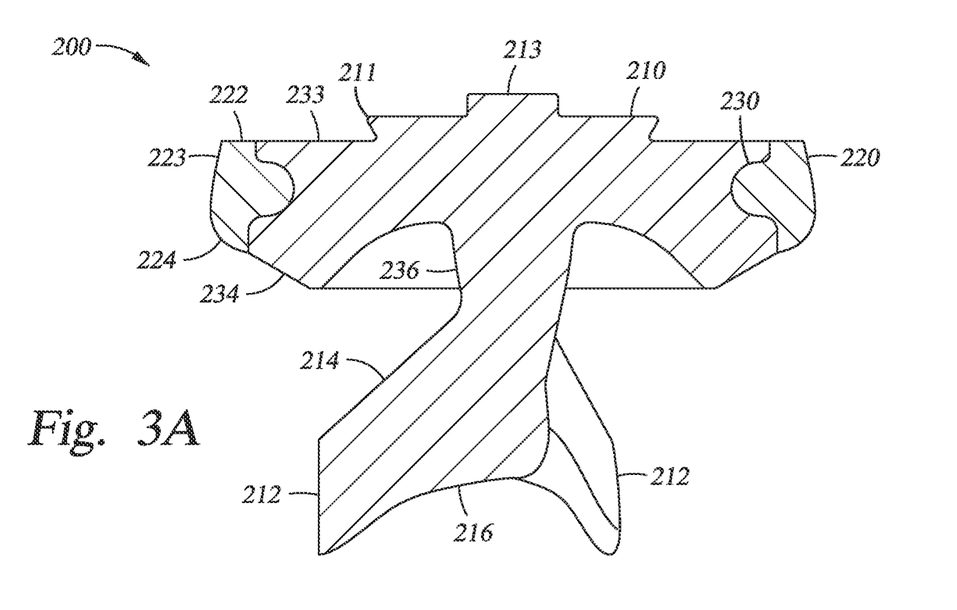
FIG. 3A illustrates a sectional view of the valve body and seal, according to one embodiment.
Figure 3B:
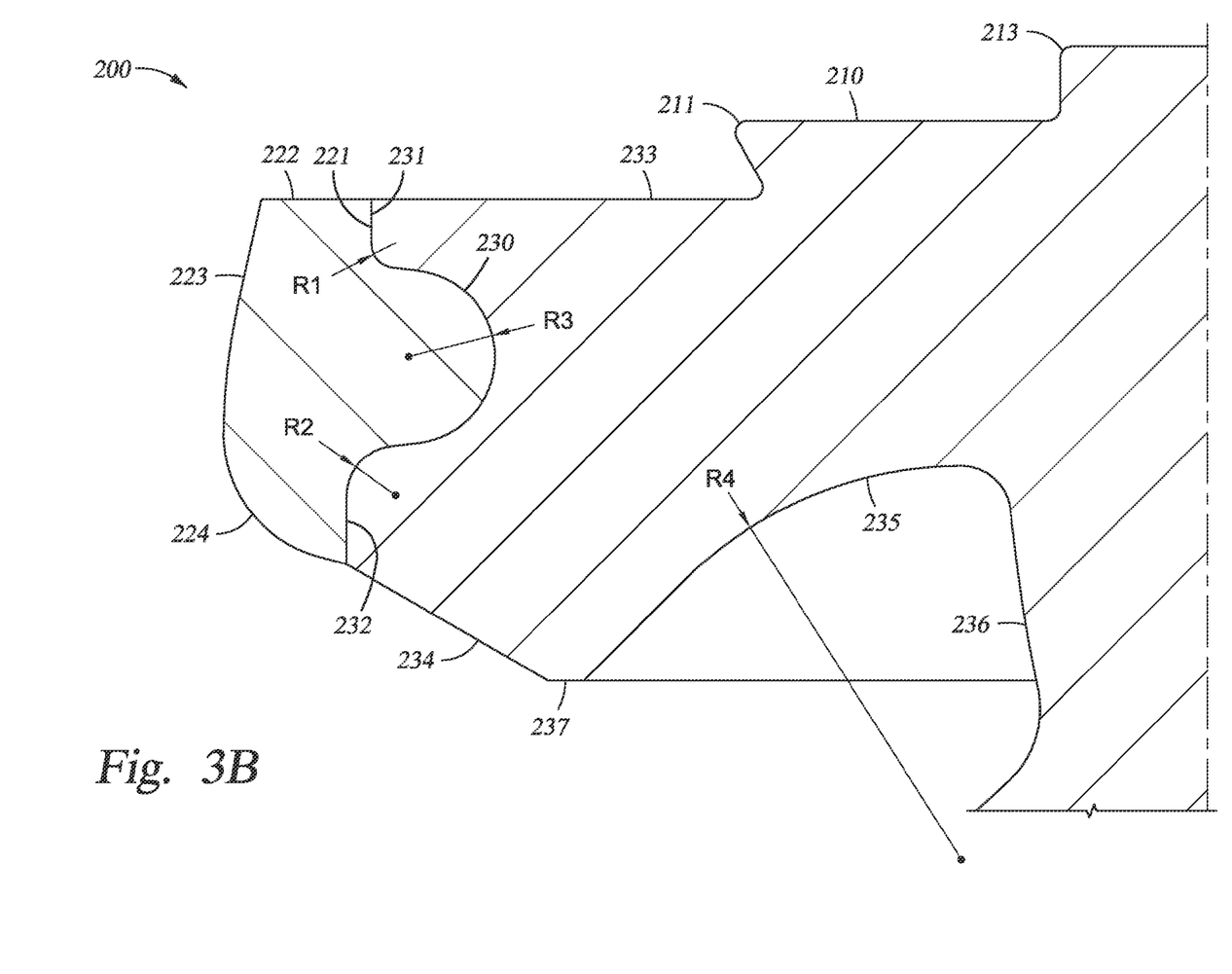
FIG. 3B illustrates an enlarged sectional view of a portion of the valve body and seal, according to one embodiment.

FIG. 3A illustrates a sectional view of the valve body 210 and the seal 220, according to one embodiment. FIG. 3B illustrates an enlarged sectional view of a portion of the valve body 210 and the seal 220, according to one embodiment. The upper portion of the valve body 210 has an outer surface defined by a groove 230 disposed between an upper planar surface 231 and a lower planar surface 232.

The groove 230 is disposed about the outer circumference of the valve body 210. The upper planar surface 231 may be substantially flat and may form a substantially perpendicular angle at the intersection between the upper planar surface 231 and a top surface 233 of the valve body 210. The lower planar surface 232 may be substantially flat and may form a non-perpendicular angle (an obtuse angle for example) at the intersection between the lower planar surface 232 and a bottom surface 234 of the valve body 210.

The upper planar surface 231 is not coplanar with the lower planar surface 232. The outer diameter of the valve body 210 about the upper planar surface 231 is less than the outer diameter of the valve body 210 about the lower planar surface 232. Alternatively, the outer diameter of the valve body 210 about the upper planar surface 231 may be greater than the outer diameter of the valve body 210 about the lower planar surface 232. Alternatively, the outer diameter of the valve body 210 about the upper planar surface 231 may be equal to the outer diameter of the valve body 210 about the lower planar surface 232 such that the upper and lower planar surfaces 231, 232 are coplanar.

As illustrated in FIG. 3B, the surface at the transition between the upper planar surface 231 and the groove 230 has a radius R1. The radius R1 may be within a range of about 0.03 inches to about 0.19 inches. The surface at the transition between the lower planar surface 232 and the groove 230 has a radius R2. The radius R2 may be within a range of about 0.03 inches to about 0.19 inches. The groove 230 has a radius R3. The radius R3 may be within a range of about 0.09 inches to about 0.38 inches. The groove 230 may have a constant radius and/or the base of the groove 230 may have a flat surface.

The valve body 210 has a curved surface 235 formed on an underside of the valve body 210 at the transition between the bottom surface 234 and an intermediate portion 236 of the valve body 210. A small flat surface 237 may be positioned between the bottom surface 234 and the curved surface 235. The curved surface 235 may have a constant radius, which helps reduce stress on and/or distribute loads across the underside of the valve body 210, which thereby increases the operating life of the valve body 210. The curved surface 235 has a radius R4, which may be within a range of about 0.38 inches to about 2 inches. The valve body 210 may include an upper shoulder 211 having an inwardly tapered surface, and/or a top button 213 that can be engaged for installation/removal of the valve body 210, such as in a fluid end.

The seal 220 has an inner surface 221 that is in contact with the groove 230, the upper planar surface 231, and the lower planar surface 232 of the valve body 210. The inner surface 221 of the seal 220 may be moulded and/or machined to correspond to the groove 230, the upper planar surface 231, and the lower planar surface 232 of the valve body 210. A top surface 222 of the seal 220 is substantially flat and substantially perpendicular to the upper planar surface 231 of the valve body 210. The top surface 222 of the seal 220 may be coplanar with the top surface 233 of the valve body 210. Alternatively, the top surface 222 of the seal 220 may extend above or be positioned below the top surface 233 of the valve body 210 such that the surfaces are not coplanar.

The top surface 222 of the seal 220 may have a length of about 0.25 inches. The depth of the groove 230 may be greater than the length of the top surface 222 of the seal 220. The depth of the groove 230 may help increase the bonding of the seal 220 to the valve body 210.

The outer surface of the seal 220 has a gradually increasing curvature defined by an upper surface 223 and a lower surface 224. The upper surface 223 intersects the top surface 222 and may have a curvature that is less than the curvature of the lower surface 224. The lower surface 224 intersects the inner surface 221 of the seal 220 and is positioned adjacent to the bottom surface 234 of the valve body 210. The lower surface 224 of the seal 220 may form a non-perpendicular angle (an obtuse angle for example) with respect to the bottom surface 234 of the valve body 210.

The lower surface 224 of the seal 220 and the bottom surface 234 of the valve body 210 each define a sealing surface. The lower surface 224 of the seal 220 is substantially curved and has a surface area that is less than the surface area of the bottom surface 234 of the valve body 210. The bottom surface 234 of the valve body 210 is substantially flat and has a surface area that is greater than the surface area of the lower surface 224 of the seal 220. The lower surface 224 of the seal 220 and the bottom surface 234 of the valve body 210 may not be parallel and/or coplanar.

Figure 4:
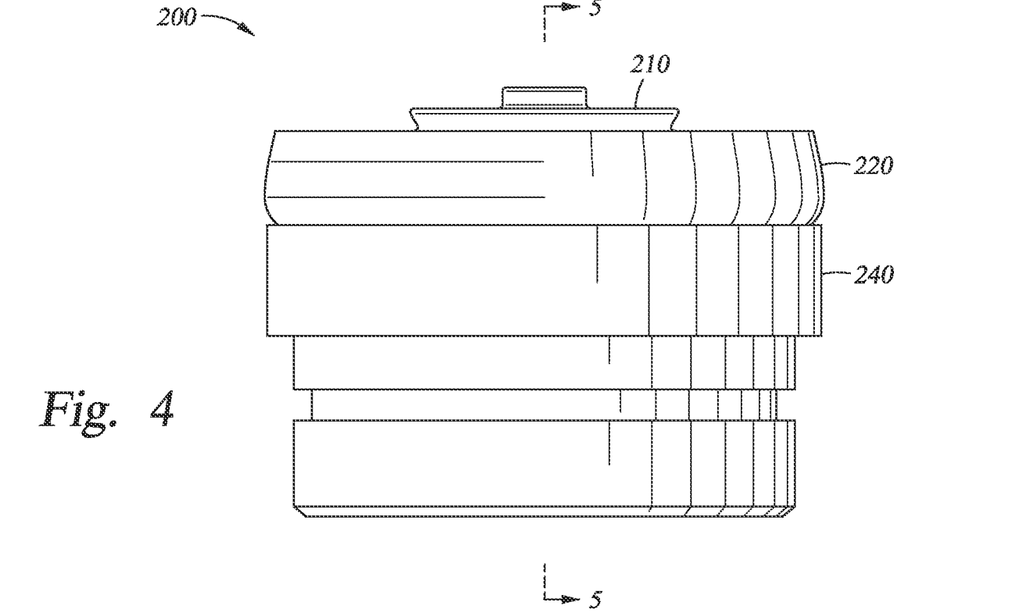
FIG. 4 illustrates the valve body and seal positioned on a seat, according to one embodiment.

FIG. 4 illustrates the valve body 210 and the seal 220 positioned on a seat 240, according to one embodiment. The valve assembly 200 may comprise the valve body 210, the seal 220, and the seat 240. The valve body 210 and the seal 220 are movable into engagement with the seat 240 (such as by biasing members 25, 35 illustrated in FIG. 1) to form a seal. The seat 240 may comprise any type of support member against which the valve body 210 and the seal 220 may be moved into contact with to form a seal. The seat 240 may be formed out of a metallic and/or a composite material.

Figure 5:
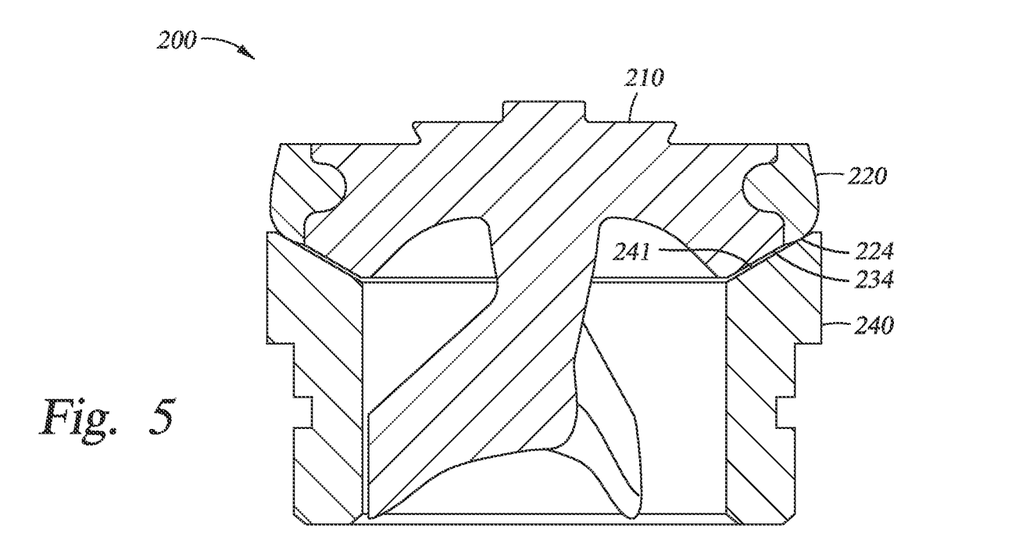
FIG. 5 illustrates a sectional view of the valve body, seal, and seat, according to one embodiment.

FIG. 5 illustrates a sectional view of the valve body 210, the seal 220, and the seat 240, according to one embodiment. The seat 240 has an upper surface 241 against which the seal 220 and the valve body 210 seal. Specifically, the lower surface 224 of the seal 220 contacts and forms a seal with the upper surface 241 of the seat 240. In addition, the bottom surface 234 of the valve body 210 contacts and forms a seal with the upper surface 241 of the seat, as further described below with respect to FIGS. 6A-6C.

Figure 6A:
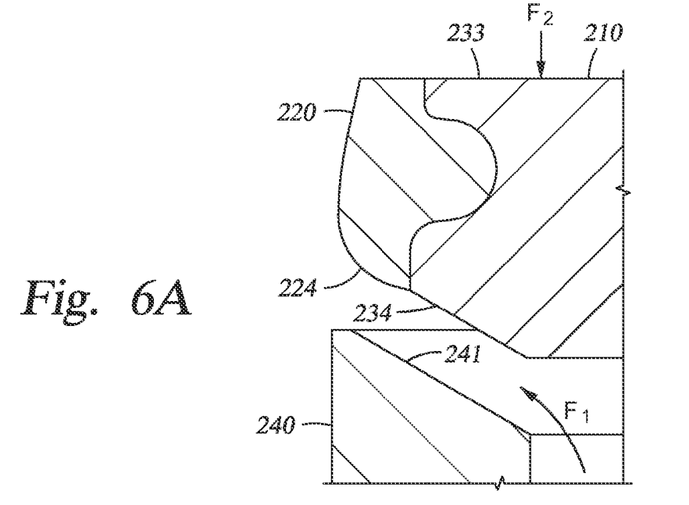
FIGS. 6A-6C illustrate enlarged sectional views of a portion of the valve body, seal, and seat, according to one embodiment.

FIG. 6A illustrates an enlarged sectional view of a portion of the valve body 210, the seal 220, and the seat 240, according to one embodiment. The valve assembly 200 is in an open position where fluid flow (identified by reference arrow F1) can flow through the open space between the upper surface 241 of the seat 240 and the lower/bottom surfaces 224, 234 of the seal 220 and the valve body 210, respectively. A pressurized fluid may apply a force against the underside of the valve body 210 and/or the seal 220 to move the valve body 210 and the seal 220 away from the seat 240, against a closing force (identified by reference arrow F2), to allow fluid flow past the valve body 210 and the seal 220. The closing force (identified by reference arrow F2) may be for example the bias force of biasing members 25, 35 as illustrated in FIG. 1 applied to the top surface 233 of the valve body 210.

Figure 6B:
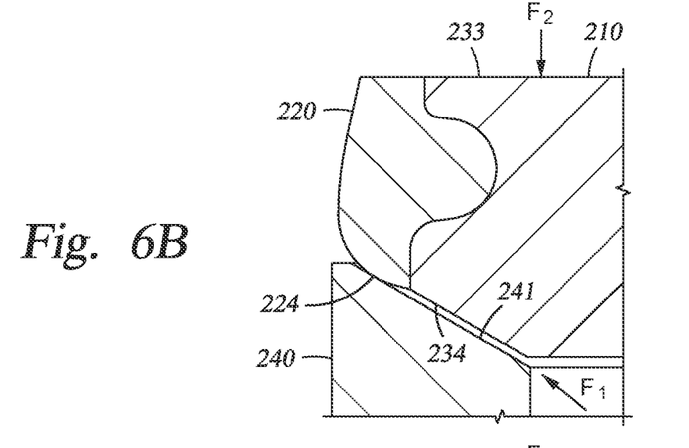

FIG. 6B illustrates the valve assembly 200 in a closed position. When the valve assembly 200 is in the closed position, the lower surface 224 of the seal 220 contacts the upper surface 241 of the seat 240 to form a seal that prevents fluid flow (identified by reference arrow F1) past the seal 220. The closing force (identified by reference arrow F2) applied to the top surface 233 of the valve body 210 moves the valve body 210 and the seal 220 into contact with the seat 240.

Figure 6C:
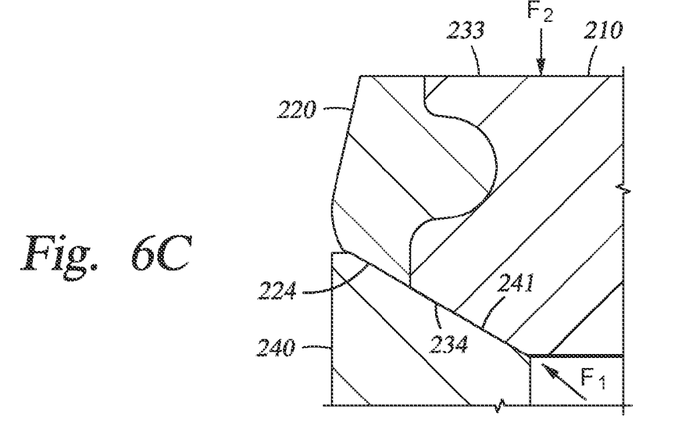

FIG. 6C also illustrates the valve assembly 200 in the closed position. In addition to the lower surface 224 of the seal 220 contacting the upper surface 241 of the seat 240, the bottom surface 234 of the valve body 210 also contacts the upper surface 241 of the seat 240 to form the seal that prevents fluid flow (identified by reference arrow F1) past the valve body 210 and the seal 220. The closing force (identified by reference arrow F2) applied to the top surface 233 of the valve body 210 moves the valve body 210 and the seal 220 into contact with the seat 240. The surface area of the bottom surface 234 of the valve body 210 is maximized to increase the contact area between the bottom surface 234 and the upper surface of the seat 240, which reduces stress on the seat 240 and thereby increases the operating life of the seat 240.

Referring to FIGS. 6B and 6C, when the valve assembly 200 is moved to the closed position, the lower surface 224 of the seal 220 contacts the upper surface 241 of the seat 240 before the bottom surface 234 of the valve body 210. The seal formed between the lower surface 224 of the seal 220 and the upper surface 241 of the seat 240 may be a low pressure seal. The seal formed between the bottom surface 234 of the valve body 210 and the upper surface 241 of the seat 240 may be a high pressure seal, such as a metal-to-metal seal, that can seal against a pressure greater than the low pressure seal.

When the bottom surface 234 of the valve body 210 is moved into contact with the upper surface 241 of the seat 240, a portion of the seal 220 may move slightly upward (such that at least a portion of the top surface 222 of the seal 220 raises above the top surface 233 of the valve body 210) and/or radially outward (as shown in FIG. 6) relative to the valve body 210 to compensate for the compression of the seal 220. Since the volume of the seal 220 is free to move upward and/or radially outward relative to the valve body 210, the compression force applied onto the seat 240 is minimized, which can thereby increase the operating life of the seal 220. In addition, since the volume of the seal 220 is free to move, separation between the seal 220 and the valve body 210 is minimized, which thereby reduces the potential for stress rupturing or breaking off of a portion of the seal 220.

In addition to the foregoing embodiments, other and further embodiments of the invention may be devised without departing from the basic scope thereof, and the scope thereof is determined by the claims that follow.

The invention claimed is:
1. A valve assembly, comprising:
a seat;
a monolithic valve body having an outer circumferential surface, wherein a cross section of the outer circumferential surface defines an upper planar surface, a lower planar surface, and a groove disposed between the upper planar surface and the lower planar surface, wherein the upper planar surface intersects a top surface at an edge of the monolithic valve body, wherein a transition between the upper planar surface and the groove has a radius R1, wherein a transition between the lower planar surface and the groove has a radius R2, wherein the groove has a constant radius R3 extending continuously from the transition between the upper planar surface and the groove to the transition between the lower planar surface and the groove, wherein an outer diameter of the monolithic valve body about the upper planar surface is equal to or less than an outer diameter of the monolithic valve body about the lower planar surface, and wherein the upper planar surface and the lower planar surface are each substantially parallel to a longitudinal axis of the monolithic valve body; and
a seal coupled to the outer circumferential surface of the monolithic valve body, wherein the monolithic valve body and the seal are movable into engagement with the seat, and wherein an inner surface of the seal contacts the upper planar surface, the groove, and the lower planar surface.

2. The assembly of claim 1, wherein the lower planar surface is non-perpendicular to a bottom surface of the monolithic valve body.

3. The assembly of claim 2, wherein the top surface of the monolithic valve body is flat, and wherein a cross section of the bottom surface of the monolithic valve body is flat.

4. The assembly of claim 1, wherein a top surface of the seal is coplanar with the top surface of the monolithic valve body.

5. The assembly of claim 4, wherein the seal has an outer circumferential surface having a gradually increasing curvature.

6. The assembly of claim 5, wherein the outer circumferential surface of the seal is defined by an upper surface and a lower surface, wherein the upper surface has a curvature less than the lower surface.

7. The assembly of claim 6, wherein the upper surface of the seal intersects the top surface of the seal, and wherein the lower surface of the seal intersects the inner surface of the seal and is positioned adjacent to the bottom surface of the monolithic valve body.

8. The assembly of claim 7, wherein the lower surface of the seal and the bottom surface of the monolithic valve body are movable into engagement with the seat, wherein the lower surface of the seal is moveable into engagement with the seat prior to the bottom surface of the monolithic valve body engaging the seat.

9. The assembly of claim 1, wherein the monolithic valve body includes one or more leg members, each leg member having a foil shaped cross section.

10. The assembly of claim 1, wherein the monolithic valve body has a curved surface formed on an underside of the monolithic valve body, wherein the curved surface has a constant radius.

11. The assembly of claim 1, wherein the radius R1 and the radius R2 are within a range of 0.03 inches to 0.19 inches.

12. The assembly of claim 11, wherein the radius R3 is within a range of 0.09 inches to 0.38 inches.

13. The assembly of claim 1, wherein the radius R1 is substantially the same as the radius R2.

14. The assembly of claim 1, wherein the radius R3 is different than the radius R1 and the radius R2.

15. A valve assembly, comprising:
a seat;
a monolithic valve body having a top surface and an outer circumferential surface, wherein a cross section of the outer circumferential surface defines an upper surface, a lower surface, and a groove disposed between the upper surface and the lower surface, wherein the upper surface intersects the top surface at an edge of the monolithic valve body, wherein a transition between the upper surface and the groove has a radius R1, wherein a transition between the lower surface and the groove has a radius R2, wherein the groove has a constant radius R3 extending continuously from the transition between the upper surface and the groove to the transition between the lower surface and the groove, wherein an outer diameter of the monolithic valve body about the upper surface is equal to or less than an outer diameter of the monolithic valve body about the lower surface, and wherein the lower surface is substantially parallel to a longitudinal axis of the monolithic valve body; and
a seal coupled to the outer circumferential surface, wherein the monolithic valve body and the seal are movable into engagement with the seat, wherein a cross section of the seal defines an inner surface that is in contact with the lower surface and is substantially parallel to the longitudinal axis of the monolithic valve body.

16. The assembly of claim 15, wherein the upper surface is substantially parallel to the longitudinal axis of the monolithic valve body.

17. The assembly of claim 15, wherein the inner surface of the seal is further in contact with the upper surface or the groove.

18. The assembly of claim 15, wherein the monolithic valve body includes one or more leg members, each leg member having a foil shaped cross section.

19. The assembly of claim 15, wherein the monolithic valve body has a curved surface formed on an underside of the monolithic valve body, wherein the curved surface has a constant radius.

20. The assembly of claim 15, wherein the radius R1 and the radius R2 are within a range of 0.03 inches to 0.19 inches.

21. The assembly of claim 20, wherein the radius R3 is within a range of 0.09 inches to 0.38 inches.

22. The assembly of claim 15, wherein the radius R1 is substantially the same as the radius R2.

23. The assembly of claim 15, wherein the radius R3 is different than the radius R1 and the radius R2.

24. A valve assembly, comprising:
a seat;
a monolithic valve body having a top surface, and an outer circumferential surface defined by an upper surface, a lower surface, and a groove disposed between the upper surface and the lower surface, wherein a transition between the upper surface and the groove has a radius R1, wherein a transition between the lower surface and the groove has a radius R2, wherein the groove has a constant radius R3 extending continuously from the transition between the upper surface and the groove to the transition between the lower surface and the groove, wherein an outer diameter of the monolithic valve body about the upper surface is equal to or less than an outer diameter of the monolithic valve body about the lower surface, and wherein the upper surface intersects the top surface at an edge of the monolithic valve body; and
a seal coupled to the outer circumferential surface, wherein the monolithic valve body and the seal are movable into engagement with the seat.

25. The assembly of claim 24, wherein the lower surface is substantially parallel to a longitudinal axis of the monolithic valve body.

26. The assembly of claim 24, wherein an inner surface of the seal contacts the upper surface, the groove, and the lower surface.

27. The assembly of claim 24, wherein the radius R1 is within a range of 0.03 inches to 0.19 inches.

28. The assembly of claim 27, wherein the radius R2 is within a range of 0.03 inches to 0.19 inches.

29. The assembly of claim 28, wherein the radius R3 is within a range of 0.09 inches to 0.38 inches.

30. The assembly of claim 24, wherein the radius R1 is substantially the same as the radius R2.

31. The assembly of claim 24, wherein the radius R3 is different than the radius R1 and the radius R2.

* * * * *